Aug. 6, 1957     D. GABRIEL     2,801,738
PHYSICIAN'S SERVICE KIT
Filed April 6, 1954
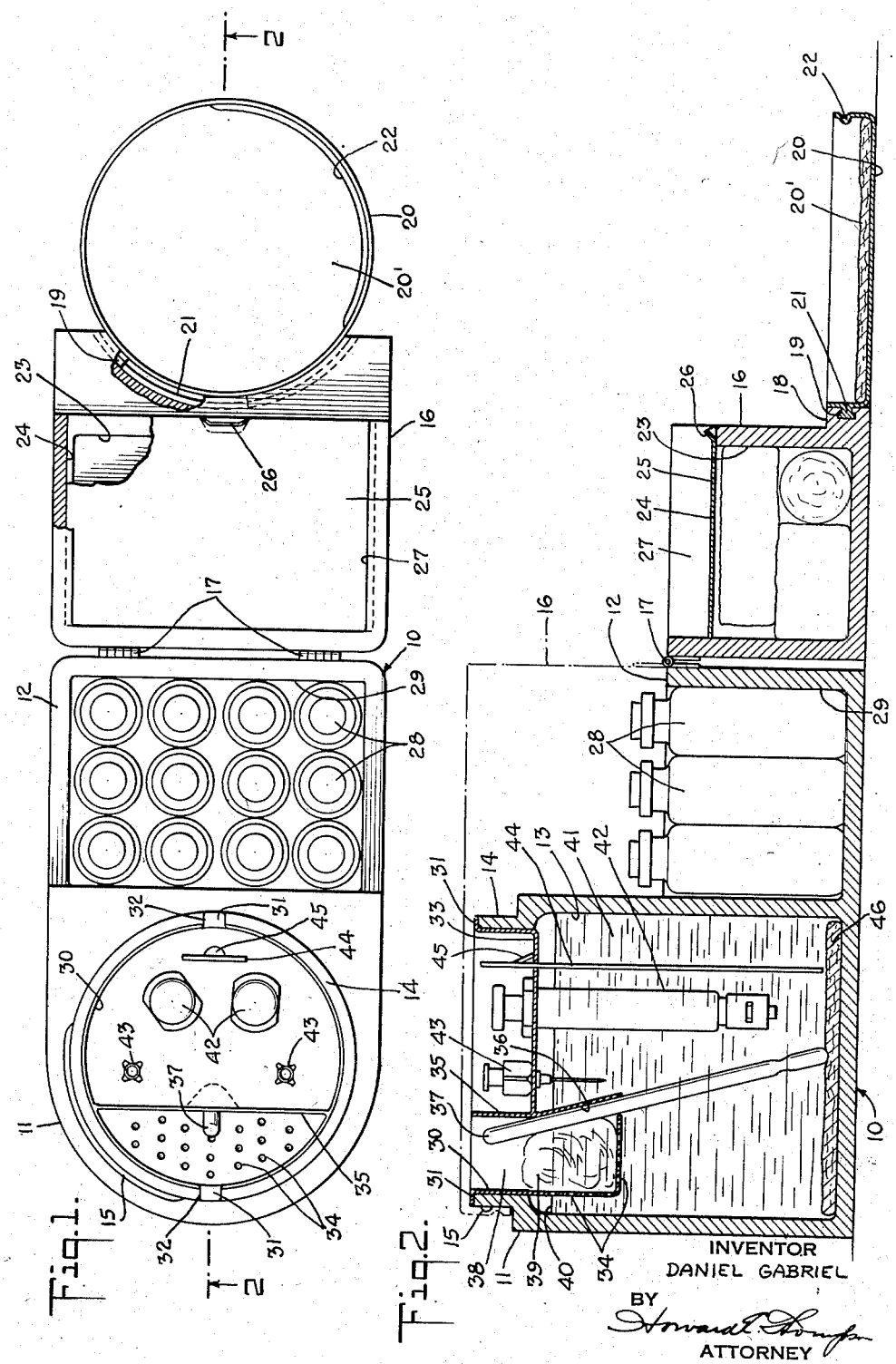
INVENTOR
DANIEL GABRIEL
BY
Howard T. Sompa
ATTORNEY

United States Patent Office 2,801,738
Patented Aug. 6, 1957

2,801,738
PHYSICIAN'S SERVICE KIT
Daniel Gabriel, Bonny Blue, Va.
Application April 6, 1954, Serial No. 421,386
12 Claims. (Cl. 206—12)

This invention relates to service kits adapted for use by physicians in making preliminary checkups on patients and in administering drugs from the medium of hypodermic needles. More particularly, the invention deals with a kit of the character described, wherein the various implements are maintained in a sterilized state facilitating immediate use thereof and, further, wherein in opening the kit, the various implements, as well as the drugs and accessories, become readily accessible for selection and use.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a plan view of a kit made according to my invention, diagrammatically illustrating the use thereof, with parts of the construction broken away and in section; and Fig. 2 is a longitudinal sectional view on the line 2—2 of Fig. 1, with parts of the construction shown in elevation.

When physicians are out on calls, difficulty has been experienced by them in utilizing their various surgical implements and devices in examining the patients and in administering certain types and kinds of drugs, particularly those injected into the patient's body through the use of hypodermic needles.

The purpose of my present invention is to provide a service kit which will compactly and conveniently store the various implements and drugs, as well as other accessories for quick selection and use and, at the same time, maintain the implements used in sterilized state by submerging the same into a chamber containing alcohol or similar sterilizing agent. Before placing the implements into the kit or the sterilizing agent of the kit, the implements can be rendered sterilized in known sterilization apparatus, such as the autoclave method.

My improved kit comprises an oblong main casing 10 having a rounded end 11 and a square end 12. The rounded end is higher than the square end, as clearly noted in Fig. 2 of the drawing, and the rounded end is fashioned to form a compartment or reservoir 13 having a rounded upwardly extending collar or flange 14, including an outwardly projecting coupling segment 15, for purposes later described. At 16 I have shown a supplemental casing part, generally rectangular in form, hinged to the main casing 10, as seen at 17.

The supplemental casing 16 has a projecting flange portion 18 with a dovetailed groove or recess 19 for rotatable mounting of a cover 20 therewith, the cover 20 having a dovetailed projection 21 operating in the recess 19, so as to provide limited rotation of the cover 20.

The cover 20 also includes a curved recess portion 22 to operatively engage the projection 15 in a wedge-like fashion in locking the cover 20 upon the flange or collar 14, when the supplemental casing 16 is in closed position, as indicated in dot and dash lines in Fig. 2 of the drawing.

The supplemental casing 16 has a recessed compartment 23, in which various accessory articles can be stored, a few articles being diagrammatically illustrated in the compartment 23.

Opposed side walls of the supplemental casing 16 have grooves 24 for reception of a sliding closure plate 25 controlling access to the compartment 23. The outer edge of the closure plate 25 has, centrally thereof, a raised fingerpiece portion 26 facilitating operation of the plate. Beyond the plate 25, the casing 16 has a recess 27 for reception of upper portions of medicines, bottles or similar containers 28, so that, when the supplemental casing 16 is in closed position, the closure plate 25 will be in close proximity to upper ends of bottles or containers 25, thus retaining the same in position within the compartment 29 of the casing 10. The cover 20 is preferably retained against accidental displacement with respect to the supplemental casing 16 and, in swinging the supplemental casing into closed position, rotation of the cover 20 will establish a coupling engagement with the flange or collar 14, thus retaining the parts firmly in position. The inner surface of the cover 20 preferably has a pad 20' of cushioning material, note Fig. 2, to engage upper ends of articles stored in the compartment or reservoir 13. This will be apparent from a consideration of Fig. 2 of the drawing.

Detachably fitted within the upper collar end 14 of the compartment 13 is an implement supporting member 30 in the form of a ring fitting snugly within the collar. The member 30 has extending lugs 31, note Fig. 1, engaging recesses 32 in the upper edge of the flange or collar 14. This definitely positions the member 30 on the casing. The lower surface has a raised bottom wall 33 and a lower bottom wall 34, the latter being substantially crescent-shaped and disposed at the rounded end 11 of the casing 10, as clearly noted in Fig. 1 of the drawing.

Between the bottom wall portions 33 and 34 is a vertical partition wall 35 and the lower portion of this wall is offset and recessed, as seen at 36, to receive and angularly arrange a thermometer 37 in the chamber 13 in the manner diagrammatically seen in Fig. 2 of the drawing. The thermometer passes through the bottom wall 34, as noted, and the purpose of this arrangement is to facilitate removal of the thermometer 37 as and when the unit member 30 is removed from the casing 10 in sterilizing various implements supported upon the wall 33, as later described. From this standpoint, it is preferred that the member 30 be composed of stainless steel so as to facilitate its placement directly into the sterilizing apparatus, as previously described.

The partition 35 forms a chamber 38 in which cotton 39 may be stored, the cotton being utilized to clear a skin surface, preparatory to utilizing a hypodermic needle or for any other medicinal purpose. It will be noted that the wall portions of the chamber 38 below the wall 33 are perforated, as seen at 40, so that alcohol or other sterilizing fluid 41 can contact the cotton and, on the other hand, the cotton will aid in maintaining the alcohol against displacement in the chamber 38.

The wall 33 has two openings for receiving and supporting two hypodermic syringes, as noted at 42 in Fig. 1 of the drawing, one of these syringes also being indicated in Fig. 2 of the drawing and two smaller openings are provided for receiving and supporting two hypodermic needles 43, again, one of which is indicated in Fig. 2 of the drawing. The wall 33 also has an elongated aperture for receiving a tongue blade 44, preferably formed of stainless steel. The upper portion of the blade has an offset lip 45 to engage the wall 43 in checking downward movement of the blade and to support the blade in withdrawing the unit 30 from the casing 10 for sterilizing or other purposes.

It will also be noted, from a consideration of Fig. 2 of the drawing, that the bottom of the compartment 13 has a pad 46 of cushioning material, against which the lower end of the thermometer 37 can rest, as noted in the drawing.

It will be apparent from a consideration of the drawings that the various implements can be readily grasped by the fingers in removal of the implements from the kit in the use thereof. The bottles or containers 28 are also readily selectable from the compartment 29 and, whenever desired, the closure plate 25 can be moved outwardly to open position to give access to the compartment 23 in removing articles stored therein.

It will also be apparent that a kit of the character described is preferably maintained in the upright position shown in Fig. 2 of the drawing. However, the pad 20' of the cover 20 acts as a gasket upon the upper edge of the flange or collar 14 to seal the fluid 41 against displacement from the compartment 13 in the handling of the kit.

Having fully described my invention, what I claim as new and desire to secure by Letters Patent is:

1. A service kit comprising a casing having a rounded end and a square end, the rounded end having a deep reservoir terminating at its upper end in a reduced collar, the square end being lower than the rounded end, a supplemental casing hinged to the square end and of a height substantially equal to the height of said rounded end when arranged upon the square end, a cover movably supported on and extending beyond the supplemental casing and arranged over and operatively engaging the collar of the rounded end of the casing in coupling the supplemental casing with the first named casing, and said cover forming a seal on said collar for the reservoir of said rounded end.

2. A service kit comprising a casing having a rounded end and a square end, the rounded end having a deep reservoir terminating at its upper end in a reduced collar, the square end being lower than the rounded end, a supplemental casing hinged to the square end and of a height substantially equal to the height of said rounded end when arranged upon the square end, a cover movably supported on and extending beyond the supplemental casing and arranged over and operatively engaging the collar of the rounded end of the casing in coupling the supplemental casing with the first named casing, said cover forming a seal on said collar for the reservoir of said rounded end, said square end of the casing having a storage chamber opening outwardly through said end, and said chamber being closed by the supplemental casing when in operative position.

3. A service kit comprising a casing having a rounded end and a square end, the rounded end having a deep reservoir terminating at its upper end in a reduced collar, the square end being lower than the rounded end, a supplemental casing hinged to the square end and of a height substantially equal to the height of said rounded end when arranged upon the square end, a cover movably supported on the supplemental casing and operatively engaging the collar of the rounded end of the casing in coupling the supplemental casing with the first named casing, said cover forming a seal on said collar for the reservoir of said rounded end, said square end of the casing having a storage chamber opening outwardly through said end, said chamber being closed by the supplemental casing when in operative position, the supplemental casing having a storage chamber, and a sliding plate controlling access to said storage chamber.

4. A service kit comprising a casing having a rounded end and a square end, the rounded end having a deep reservoir terminating at its upper end in a reduced collar, the square end being lower than the rounded end, a supplemental casing hinged to the square end and of a height substantially equal to the height of said rounded end when arranged upon the square end, a cover movably supported on the supplemental casing and operatively engaging the collar of the rounded end of the casing in coupling the supplemental casing with the first named casing, said cover forming a seal on said collar for the reservoir of said rounded end, said square end of the casing having a storage chamber opening outwardly through said end, said chamber being closed by the supplemental casing when in operative position, the supplemental casing having a storage chamber, a sliding plate controlling access to said storage chamber, and means detachably mounted in the reservoir of the rounded end of said casing for supporting a plurality of implements in said reservoir.

5. A service kit comprising a casing having a rounded end and a square end, the rounded end having a deep reservoir terminating at its upper end in a reduced collar, the square end being lower than the rounded end, a supplemental casing hinged to the square end and of a height substantially equal to the height of said rounded end when arranged upon the square end, a cover movably supported on the supplemental casing and operatively engaging the collar of the rounded end of the casing in coupling the supplemental casing with the first named casing, said cover forming a seal on said collar for the reservoir of said rounded end, said square end of the casing having a storage chamber opening outwardly through said end, said chamber being closed by the supplemental casing when in operative position, the supplemental casing having a storage chamber, a sliding plate controlling access to said storage chamber, means detachably mounted in the reservoir of the rounded end of said casing for supporting a plurality of implements in said reservoir, said last named means comprising a sheet metal member fitting snugly within the collar of said rounded end, said member having deep and shallow compartments partitioned one from the other, and the deep compartment having a perforated lower portion exposed to said reservoir.

6. A service kit comprising a casing having a rounded end and a square end, the rounded end having a deep reservoir terminating at its upper end in a reduced collar, the square end being lower than the rounded end, a supplemental casing hinged to the square end and of a height substantially equal to the height of said rounded end when arranged upon the square end, a cover movably supported on the supplemental casing and operatively engaging the collar of the rounded end of the casing in coupling the supplemental casing with the first named casing, said cover forming a seal on said collar for the reservoir of said rounded end, said square end of the casing having a storage chamber opening outwardly through said end, said chamber being closed by the supplemental casing when in operative position, the supplemental casing having a storage chamber, a sliding plate controlling access to said storage chamber, means detachably mounted in the reservoir of the rounded end of said casing for supporting a plurality of implements in said reservoir, said last named means comprising a sheet metal member fitting snugly within the collar of said rounded end, said member having deep and shallow compartments partitioned one from the other, the deep compartment having a perforated lower portion exposed to said reservoir, and said deep compartment having an offset recess for support of a medicinal thermometer with an end disposed in said deep compartment.

7. A service kit comprising a casing having a rounded end and a square end, the rounded end having a deep reservoir terminating at its upper end in a reduced collar, the square end being lower than the rounded end, a supplemental casing hinged to the square end and of a height substantially equal to the height of said rounded end when arranged upon the square end, a cover movably supported on and extending beyond the supplemental casing and arranged over and operatively engaging the collar of the rounded end of the casing in coupling the supplemental casing with the first named casing, said cover forming a seal on said collar for the reservoir of said rounded end, a metallic ring-like member detachably supported in the collar of said reservoir, said member including a bottom wall apertured to receive a plurality of implements in spaced relationship to each other for support on said bottom wall and for collective insertion and removal from the reservoir by said member.

8. A service kit comprising a casing having a rounded end and a square end, the rounded end having a deep reservoir terminating at its upper end in a reduced collar, the square end being lower than the rounded end, a supplemental casing hinged to the square end and of a height substantially equal to the height of said rounded end when arranged upon the square end, a cover movably supported on and extending beyond the supplemental casing and arranged over and operatively engaging the collar of the rounded end of the casing in coupling the supplemental casing with the first named casing, said cover forming a seal on said collar for the reservoir of said rounded end, a metallic ring-like member detachably supported in the collar of said reservoir, said member including a bottom wall apertured to receive a plurality of implements in spaced relationship to each other for support on said bottom wall and for collective insertion and removal from the reservoir by said member, and said member having a deep apertured compartment exposed to the reservoir.

9. A physician's service kit of the character described, a casing having a reservoir for reception of a sterilizing fluid, means detachable with respect to the casing for supporting a plurality of implements in the fluid of said serservoir, means detachably and movably supported on the casing for sealing said reservoir and for retaining said implements from displacement with respect to said reservoir, said casing having other means for storage of medicinal containers in spaced realtionship to said reservoir, said last named means including a supplemental casing part hinged to the first named casing, and said second means being movably coupled with the supplemental casing and adapted to retain the supplemental casing in collapsed position on the first named casing.

10. A kit of the character described, comprising a main casing having a high end and a low end, a supplemental casing movably coupled with the low end of the main casing and adapted to be arranged over said low end of the casing in the collapsed position of said kit, and means movably supported on the supplemental casing and rotatably coupled with the main casing for securing the supplemental casing in closed position on said main casing.

11. A kit of the character described, comprising a main casing having a high end and a low end, a supplemental casing movably coupled with the low end of the main casing and adapted to be arranged over said low end of the casing in the collapsed position of said kit, means movably supported on the supplemental casing and rotatably coupled with the main casing for securing the supplemental casing in closed position on said main casing, said high end of the main casing being open at the top, and said last named means forming a closure and seal for the open top of the high end of said casing.

12. A device of the character described for supporting implements in sterile state, preparatory to the use thereof, said device comprising a casing, means integral with the casing forming a storage for sterilizing fluid, an implement supporting member fitting snugly within and supported in said last named means for submersion of implements in the sterilizing fluid disposed in said means, a detachable cover forming a closure for said means, said casing having a storage chamber at one side of said first named means, a cover hinged to said casing, said member having a deep compartment, including a perforated lower portion, and means, in the deep compartment, for supporting a medical thermometer with one end portion of the thermometer exposed in the upper end of said deep compartment.

References Cited in the file of this patent

UNITED STATES PATENTS

| | | |
|---|---|---|
| 59,086 | Skinner | Oct. 23, 1866 |
| 2,346,725 | Butzke | Apr. 18, 1944 |
| 2,460,427 | Musselman | Feb. 1, 1949 |
| 2,559,289 | Eisen | July 3, 1951 |

FOREIGN PATENTS

| | | |
|---|---|---|
| 811,263 | Germany | Aug. 20, 1951 |
| 3,306 | Great Britain | 1913 |